US007901739B2

(12) United States Patent
Fairbourn (10) Patent No.: US 7,901,739 B2
(45) Date of Patent: Mar. 8, 2011

(54) GAS TURBINE ENGINE COMPONENTS WITH ALUMINIDE COATINGS AND METHOD OF FORMING SUCH ALUMINIDE COATINGS ON GAS TURBINE ENGINE COMPONENTS

(75) Inventor: David C. Fairbourn, Sandy, UT (US)

(73) Assignee: MT Coatings, LLC, Cincinnati, OH (US)

( * ) Notice: Subject to any disclaimer, the term of this patent is extended or adjusted under 35 U.S.C. 154(b) by 905 days.

(21) Appl. No.: 11/575,105

(22) PCT Filed: Apr. 13, 2005

(86) PCT No.: PCT/US2005/012527
§ 371 (c)(1),
(2), (4) Date: Mar. 12, 2007

(87) PCT Pub. No.: WO2006/052277
PCT Pub. Date: May 18, 2006

(65) Prior Publication Data
US 2008/0220165 A1 Sep. 11, 2008

Related U.S. Application Data

(63) Continuation-in-part of application No. PCT/US2004/041896, filed on Dec. 13, 2004, and a continuation-in-part of application No. 10/943,116, filed on Sep. 16, 2004, now abandoned.

(51) Int. Cl.
*B05D 5/00* (2006.01)
*B05D 7/14* (2006.01)
*C23C 10/48* (2006.01)
*C23C 10/58* (2006.01)

(52) U.S. Cl. ............... 427/419.1; 427/253; 427/255.39

(58) Field of Classification Search .............. 427/253, 427/255.11, 255.18, 255.17, 255.39, 327, 427/328, 404, 405, 419.1
See application file for complete search history.

(56) References Cited

U.S. PATENT DOCUMENTS

| 3,615,885 A | 10/1971 | Watson et al. |
| 3,849,865 A | 11/1974 | Gedwill et al. |
| 4,321,311 A | 3/1982 | Strangman |
| 4,427,720 A | 1/1984 | Gauje |
| 4,500,364 A | 2/1985 | Krutenat |
| 4,835,011 A | 5/1989 | Olson et al. |
| 4,880,614 A | 11/1989 | Strangman et al. |
| 4,916,022 A | 4/1990 | Solfest et al. |
| 5,015,502 A | 5/1991 | Strangman et al. |
| 5,512,382 A | 4/1996 | Strangman |
| 5,514,482 A | 5/1996 | Strangman |
| 5,562,998 A | 10/1996 | Strangman |
| 5,624,721 A | 4/1997 | Strangman |
| 5,721,061 A | 2/1998 | Jackson et al. |
| 5,780,110 A | 7/1998 | Schaeffer et al. |
| 5,837,385 A | 11/1998 | Schaeffer et al. |
| 5,900,283 A | 5/1999 | Vakil et al. |
| 6,103,386 A | 8/2000 | Raybould et al. |
| 6,224,963 B1 | 5/2001 | Strangman |
| 6,287,644 B1 | 9/2001 | Jackson et al. |
| 6,395,343 B1 | 5/2002 | Strangman |
| 6,458,473 B1 | 10/2002 | Conner et al. |
| 6,482,537 B1 | 11/2002 | Strangman et al. |
| 6,579,627 B1 | 6/2003 | Darolia et al. |
| 6,605,161 B2 * | 8/2003 | Fairbourn ............... 148/243 |
| 6,635,124 B1 * | 10/2003 | Stowell et al. ............ 148/277 |
| 6,673,709 B2 | 1/2004 | Jaslier et al. |
| 6,689,422 B1 * | 2/2004 | Warnes et al. ........ 427/255.11 |
| 6,797,408 B2 | 9/2004 | Walston et al. |
| 6,849,132 B2 | 2/2005 | Warnes et al. |
| 6,884,470 B2 | 4/2005 | Gorman |
| 6,924,038 B1 | 8/2005 | Hardy et al. |
| 2002/0023696 A1 | 2/2002 | Jaslier et al. |
| 2002/0179191 A1 | 12/2002 | Fairbourn |
| 2003/0185990 A1 | 10/2003 | Bittner et al. |

(Continued)

FOREIGN PATENT DOCUMENTS

DE 4103994 A 8/1992

(Continued)

OTHER PUBLICATIONS

European Patent Office, International Search Report issued in corresponding PCT Application serial No. PCT/US2004/041896 dated May 27, 2005.

(Continued)

*Primary Examiner* — William Phillip Fletcher, III
(74) *Attorney, Agent, or Firm* — Wood, Herron & Evans, LLP (57) ABSTRACT

A turbine engine component (10) with a protective aluminide coating (14) that include additions of silicon and a dopant, such as yttrium and/or hafnium, in an amount effective to reduce sulfidation and a deposition process for forming such aluminide coatings (14). A silicon-containing layer (30) may be applied to the superalloy substrate (12) of the component (10) and the aluminide coating (14) formed by exposing component (10) and layer (30) to a vapor phase reactant containing the dopant. The aluminide coating (14), which contains dopant from the layer (30), may operate as a standalone environmental coating or as a bond coating for an optional ceramic thermal barrier layer (24). An optional zirconia layer (26) maybe provided between the aluminide coating (14) and the ceramic thermal barrier layer (24). Alternatively, the dopant may be included in the silicon-containing layer (30) applied to the component (10) before the aluminide coating (14) is formed and no vapor phase reactant containing the dopant is required.

11 Claims, 5 Drawing Sheets

U.S. PATENT DOCUMENTS

| | | |
|---|---|---|
| 2004/0038069 A1 | 2/2004 | Warnes et al. |
| 2004/0067317 A1 | 4/2004 | Gorman |
| 2005/0000425 A1 | 1/2005 | Fairbourn |
| 2005/0170200 A1 | 8/2005 | Nagaraj et al. |
| 2006/0057418 A1 | 3/2006 | Fairbourn |

FOREIGN PATENT DOCUMENTS

| | | | |
|---|---|---|---|
| EP | 0048083 | A1 | 3/1982 |
| EP | 0327311 | A2 | 8/1989 |
| EP | 0532255 | A1 | 3/1993 |
| EP | 0821078 | A1 | 1/1998 |
| EP | 0897996 | A1 | 2/1999 |
| EP | 0992612 | A2 | 4/2000 |
| EP | 0992613 | A2 | 4/2000 |
| EP | 1008672 | A1 | 6/2000 |
| EP | 1010774 | A1 | 6/2000 |
| EP | 1079073 | A2 | 2/2001 |
| EP | 1111192 | A1 | 6/2001 |
| EP | 1199377 | A2 | 4/2002 |
| EP | 1229146 | A2 | 8/2002 |
| EP | 1338668 | A1 | 8/2003 |
| GB | 1439947 | A | 6/1976 |
| GB | 1479498 | A | 7/1977 |
| GB | 1529441 | A | 10/1978 |
| GB | 2202235 | A | 9/1988 |
| GB | 2252567 | A | 8/1992 |
| GB | 2285632 | A | 7/1995 |
| JP | 60100657 | A | 4/1985 |
| WO | 9830735 | A2 | 7/1998 |
| WO | 9924647 | A1 | 5/1999 |
| WO | 0190441 | A2 | 11/2001 |
| WO | WO 01/90438 | A1 * | 11/2001 |
| WO | 02099153 | A2 | 12/2002 |
| WO | 03035942 | A2 | 5/2003 |
| WO | 2006036171 | A1 | 4/2006 |

OTHER PUBLICATIONS

European Patent Office, International Search Report issued in corresponding PCT Application serial No. PCT/US2005/045078 dated Oct. 10, 2006.

European Patent Office, International Search Report issued in corresponding PCT Application Serial No. PCT/US2005/012527 dated Nov. 24, 2006.

European Patent Office, International Search Report issued in corresponding PCT Application serial No. PCT/US2005/044843 dated Jun. 14, 2007.

Savage, Jason L., U.S. Patent and Trademark Office, Office Action Dated Jun. 29, 2007 in related U.S. Appl. No. 10/943,116.

Savage, Jason L., U.S. Patent and Trademark Office, Office Action Dated Jan. 25, 2007 in related U.S. Appl. No. 10/943,116.

European Patent Office Official Letter in corresponding EP 05851165.0, dated Jul. 24, 2009, 4 pages.

European Patent Office Official Letter in corresponding EP 05858676.9, dated Jul. 24, 2009, 4 pages.

* cited by examiner

GAS TURBINE ENGINE COMPONENTS WITH ALUMINIDE COATINGS AND METHOD OF FORMING SUCH ALUMINIDE COATINGS ON GAS TURBINE ENGINE COMPONENTS

CROSS-REFERENCE TO RELATED APPLICATIONS

This application is a continuation-in-part of PCT/US2004/041896, filed on Dec. 13, 2004, which is a continuation-in-part of application Ser. No. 10/943,116, filed Sep. 16, 2004, the disclosure of each of which is hereby fully incorporated by reference herein in its entirety.

FIELD OF THE INVENTION

The present invention relates to coated metal components and, more particularly, gas turbine engine components with an aluminide coating and methods of forming such aluminide coatings on gas turbine engine components.

BACKGROUND OF THE INVENTION

Intermetallic layers and coatings are often formed on a surface of a metal component to protect the underlying metal substrate of the component and to extend its useful life during operation. For example, many superalloy components in gas turbine engines, like turbine blades, vanes, and nozzle guides, include an aluminide coating on airflow surfaces that protects the underlying superalloy base metal from high temperature oxidation and corrosion. Among other applications, gas turbine engines are used as aircraft or jet engines, like turbofans, in electromotive power generation equipment to generate electricity, such as industrial gas turbine engines, and as power plants providing motive forces to propel vehicles.

Generally, gas turbine engines include a compressor for compressing air, a combustor for mixing the compressed air with fuel, such as jet fuel or natural gas, and igniting the mixture, and a turbine blade assembly for producing power. In particular, gas turbine engines operate by drawing air into the front of the engine. The air is then compressed, mixed with fuel, and combusted. Hot exhaust gases from the combusted mixture pass through a turbine, which causes the turbine to spin and thereby powers the compressor. Aircraft gas turbine engines, referred to herein as jet engines, propel the attached aircraft forward in response to the thrust provided by the flow of the hot exhaust gases from the gas turbine engine. Rotation of the turbine in industrial gas turbine engines generates electrical power and motive power for vehicles.

Air flow surfaces of certain gas turbine engine components are directly contacted by the hot exhaust gases. The hot exhaust gases heat these components to high temperatures and expose them to impurity elements, like sulfur, originating from the combusted fuel. Superalloys, in particular, are susceptible to severe oxidation and corrosion in such harsh environments, particularly when the superalloy components of the gas turbine engine are exposed to the hot exhaust gas stream created in a jet engine. One type of corrosion results from enhanced oxidation experienced by superalloys at high temperatures, such as the portions of the gas turbine engine directly exposed to the hot exhaust gas stream. Sulfidation is another type of corrosion experienced by superalloy gas turbine engine components exposed to sulfur originating from the hot exhaust gases and other environmental sources. Generally, sulfidation increases the oxidation efficiency of superalloys and, in particular, the oxidation rate of nickel-based superalloys. Sulfidation is often observed in superalloy gas turbine components that are heated to temperatures below about 1500° F. when directly exposed to exhaust gas steams. Sulfidation also occurs in superalloy gas turbine components having portions that are shielded from exposure to the direct exhaust gas stream and, as a result, operate at a temperature less than about 1500° F. For example, certain gas turbine blades include an airfoil segment that is heated to a temperature greater than 1500° F. when exposed to an exhaust gas stream, a root used to secure the gas turbine blade to a turbine disk of the gas turbine engine, and a platform that separates the airfoil segment from the root. In such gas turbine blades, the root, which is not directly exposed to the exhaust gas stream, is heated by conduction from the airfoil segment and also cooled to less than 1500° F. by heat transfer to the more massive turbine disk.

To shield gas turbine components from hot exhaust gases, a ceramic thermal barrier coating may be applied directly to the superalloy substrate is an addition to an aluminide coating. As a result, the combustion and exhaust gases from the gas turbine engine may be hotter than would otherwise be possible with only a protective coating of aluminide. Increasing the temperature of the hot exhaust gases improves the efficiency of operation of the gas turbine engine. However, such ceramic thermal barrier coatings may not adhere well when applied directly to the superalloys commonly used to form gas turbine engine components and, while in service in the gas turbine engine, tend to spall.

To improve adhesion and thereby spalling resistance, a bond coating may be applied to the gas turbine engine component before the ceramic thermal barrier coating is applied. Intermetallic aluminides, like platinum aluminide and MCrAlY's, are common examples of such bond coatings that have been in use for many years. However, platinum aluminides are expensive to produce, which contributes to increasing the cost of gas turbine engine components and the cost of refurbishing used gas turbine engine components. MCrAlY's must be applied using expensive equipment.

Accordingly, there is a need for a gas turbine engine component with an aluminide coating that improves on conventional aluminide coatings and methods of forming such coatings on gas turbine engine components. There is also a need for a gas turbine engine component with a bond coating that is competitive in performance with platinum aluminide and less expensive to produce than platinum aluminide, and for methods of forming such coatings on gas turbine engine components. There is also a need for a gas turbine engine component with a modified aluminide coating that can protect the coated area specifically from sulfidation, and methods of forming such coatings on gas turbine engine components.

SUMMARY OF INVENTION

The present invention provides, in one aspect, a gas turbine engine component protected against oxidation and corrosion by an aluminide coating including silicon and a dopant, such as yttrium and/or hafnium, in an amount effective to reduce the transport of sulfur across the aluminide coating to a superalloy substrate, in which the aluminide coating defines a working surface exposed to the environment when the gas turbine engine component in service. In another aspect, the present invention provides a gas turbine engine component with an aluminide coating including silicon and a dopant, such as yttrium and/or hafnium, effective to reduce the transport of sulfur across the aluminide coating to a superalloy substrate, and a zirconia layer on the aluminide coating. The gas turbine engine component may further include a ceramic thermal barrier layer on the zirconia layer. The aluminide coating supplies a bond coating competitive in performance with platinum aluminide and less expensive to produce than platinum aluminide. The aluminide layer also protects the coated surface of the gas turbine engine component against sulfidation, which may accelerate corrosion by oxidation.

In another aspect of the invention, a deposition process comprises forming an aluminide coating, which contains silicon and a dopant, such as yttrium and/or hafnium, effective to reduce the transport of sulfur across the aluminide coating to the surface, on a superalloy gas turbine engine component, such as a turbine blade. The protective coating may be any of the aluminide environmental and bond coatings described herein. The deposition process provides an aluminide coating on the gas turbine engine component that can substitute for platinum aluminide and that protects the underlying superalloy substrate against sulfidation.

These and other benefits and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION OF PREFERRED EMBODIMENTS

Figure 1:
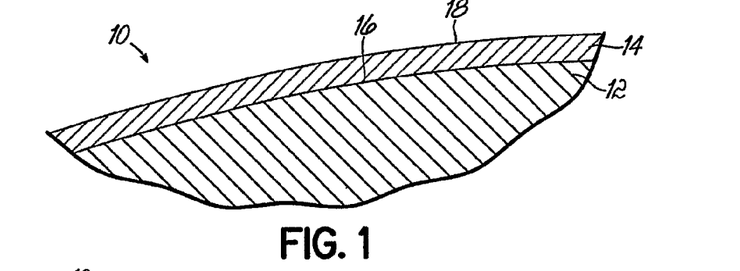
FIG. 1 is a diagrammatic cross-sectional view of a portion of a coated gas turbine engine component of the present invention.

With reference to FIG. 1, a detailed view of a portion of a much larger gas turbine engine component, generally indicated by reference numeral 10, is shown. The gas turbine engine component 10 includes a metallic substrate 12 and an aluminide coating 14 coating an original surface 16 of the substrate 12. The metallic substrate 12 is made of any nickel-, cobalt-, or iron-based high temperature superalloy from which such gas turbine engine components 10 are commonly made. The base element, typically nickel or cobalt, is by weight the single greatest element in the superalloy. For example, where the component 10 is a gas turbine component in a jet engine, substrate 12 may be the nickel-based superalloy Inconel 795 Mod5A. The present invention is, however, not intended to be limited to any particular gas turbine engine component 10, which may be a turbine blade, a vane, a nozzle guide, or any other part requiring protection from high temperature oxidation and corrosion while operating in a jet engine or while operating in an industrial gas turbine engine. The substrate 12 may be masked to define areas on the gas turbine engine component 10 across which the aluminide coating 14 is absent.

In this specific embodiment of the present invention, aluminide coating 14 operates as an environmental coating having a working surface 18 exposed to the atmosphere with the gas turbine engine component 10 in service. The general composition of aluminide coating 14 is an aluminide containing concentrations of silicon and yttrium as a dopant. The concentration of silicon in the aluminide coating 14 may be, for example, about 0.5 percent by weight (wt %). The average concentration of yttrium across the thickness of the aluminide coating 14 may be, for example, in a range of parts per million to about 0.5 wt %. Yttrium may be present with a uniform concentration through the aluminide coating 14 or may be present with a concentration gradient. The peak concentration of the concentration gradient may be at or near the working surface 18. As the aluminide coating 14 erodes away, yttrium is preferably distributed in coating 14 so that the coating 14 will continuously have a dopant concentration effective for gettering sulfur.

Aluminide coating 14 may be formed by coating the substrate 12 with a layer of a silicon-containing material and placing it into a chemical vapor deposition environment suitable for forming an aluminide coating on gas turbine engine component 10. An exemplary procedure for coating gas turbine engine components with a silicon-coating material before aluminding is described in commonly-owned U.S. Pat. No. 6,605,161. After the growth of aluminide coating 14 is initiated, the deposition environment is modified to include a vapor of an yttrium-containing material. An exemplary method for introducing additional elements from a separate receptacle to a main reaction chamber defining the bulk of the chemical vapor deposition environment is described in commonly-owned U.S. application Ser. No. 10/613,620, entitled "Simple Chemical Vapor Deposition System and Methods for Depositing Multiple-Metal Aluminide Coatings." When the vapor of the yttrium-containing material is proximate to the gas turbine engine component 10, atoms of the yttrium-containing material are incorporated into the thickening aluminide coating 14. Preferably, the exposure to the yttrium-containing material is limited to the latter 25% of the total deposition time for aluminide coating 14 and yttrium atoms diffuse from the deposition environment into aluminide coating 14. An additional post-deposition heat treatment may be required to diffuse the yttrium into aluminide coating 14.

The presence of silicon in the aluminide coating 14 permits a desired thickness of coating 14 to be formed in a reduced period of time as compared to a conventional deposition process. Alternatively, a thicker aluminide coating 14 may advantageously be formed where the cycle time is not substantially reduced with a pre-coated component 10 as compared to another component that was not pre-coated. Yttrium operates as a getter for the impurity or tramp element sulfur in the aluminide coating 14, which originates from the donor material for forming the aluminide coating 14 and from the hot exhaust gases produced by the gas turbine of the jet engine or industrial gas turbine engine with which the gas turbine engine component 10 is associated when in service. This reduces the transport of sulfur across the thickness of the protective coating 14 to the substrate 12 and thereby shields the superalloy material of the substrate 12 from sulfur. The sulfur gettering is believed to be particularly applicable to gas turbine engine components in jet engines, wherein the exhaust gases may be hotter than in industrial gas turbine engines. The gettering of sulfur by the yttrium is believed to reduce the likelihood that the aluminide coating 14 will spall or flake by selective-area delamination.

In alternative embodiments of the present invention, the aluminide coating 14 may include a concentration of hafnium as a dopant either in addition to, or instead of, yttrium. Hafnium may also getter sulfur, which is believed to reduce spalling of the aluminide coating 14. The aluminide coating 14 may, either alternatively or in addition to yttrium and/or hafnium, include other beneficial dopants capable of inhibiting or preventing corrosion and, in particular, inhibiting or preventing the acceleration of oxidation by sulfidation.

Figure 1A:
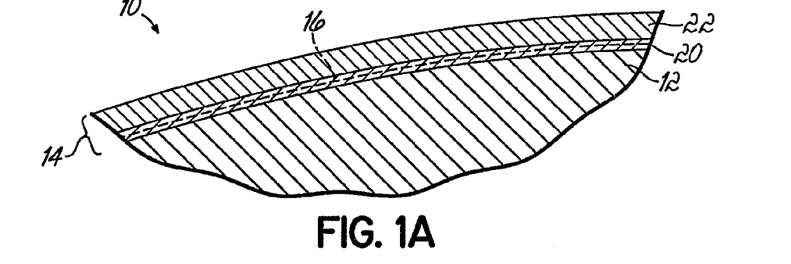
FIG. 1A is a diagrammatic cross-sectional view similar to FIG. 1 of a portion of a coated gas turbine engine component.

With reference to FIG. 7A in which like reference numerals refer to like features in FIG. 1 and in accordance with an alternative embodiment of the present invention, aluminide coating 14 may partially diffuse into the substrate 12 beneath the original surface 16 of the substrate 12. The resulting aluminide coating 14 includes a diffusion region 20 that extends beneath the formed position of the original surface 16 and an additive region 22 overlying the former position of the original surface 16 of substrate 12. The outermost boundary of additive region 22 defines the working surface 18 of aluminide coating 14 when the gas turbine engine component 10 is in service. Additive region 22 is an alloy that includes a relatively high concentration of the donor metal aluminum and a concentration of a metal, for example nickel, from substrate 12 outwardly diffusing from component 10. By contrast, diffusion region 20 has a lower concentration of aluminum and a relatively high concentration of the metal of substrate 12. Yttrium may be present with a uniform concentration through the aluminide coating 14 or may be present with a concentration gradient having a peak concentration, for example, near the interface between the diffusion region 20 and the additive region 22.

The invention contemplates that the aluminide coating 14 may reside as a distinct stratum on the original surface 16, as shown in FIG. 1, or constitute diffusion and additive regions 20, 22, as shown in FIG. 1A.

Figure 2:
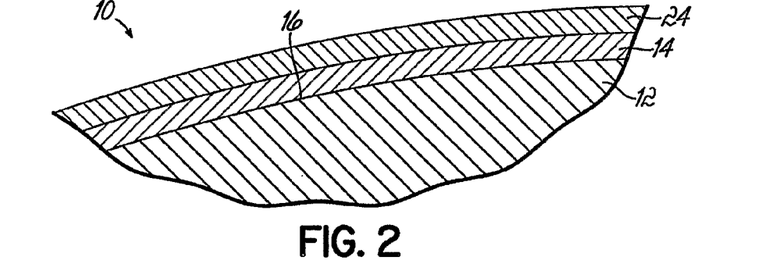
FIG. 2 is a diagrammatic view of the portion of the coated gas turbine engine component of FIG. 1 coated with a ceramic thermal barrier coating.

With reference to FIG. 2 in which like reference numerals refer to like features in FIG. 1, aluminide coating 14 may operate as a bond coating covered by a relatively thick ceramic thermal barrier coating or layer 24 of yttria stabilized zirconia (YSZ or $Y_2O_3$). Such thermal barrier coatings and methods for the application thereof are familiar to those of ordinary skill in the art. The YSZ layer 24 may be applied to the gas turbine engine component 10 by electron beam physical vapor deposition in a different deposition environment from the process forming aluminide coating 14. When applied by this deposition technique, the YSZ layer 24 typically has a porous columnar microstructure with individual grains oriented substantially perpendicular to the original surface 16 of substrate 12. Of course, the YSZ layer 24 may be omitted if not required when the gas turbine engine component 10 is in service.

Figure 3:
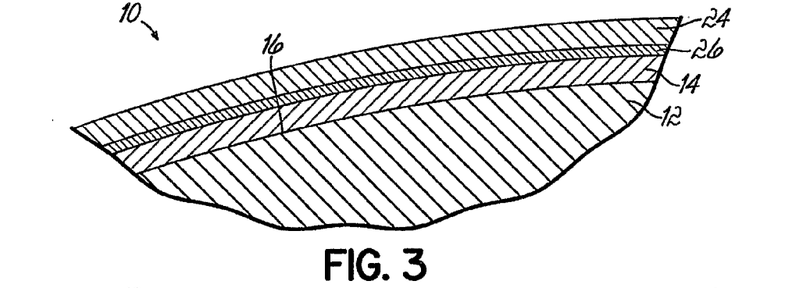
FIG. 3 is a diagrammatic cross-sectional view of a portion of a coated gas turbine engine component in accordance with another alternative embodiment of the present invention.

With reference to FIG. 3 in which like reference numerals refer to like features in FIG. 1 and in accordance with an alternative embodiment of the present invention, a thin layer 26 of zirconia is provided between the aluminide coating 14 and the YSZ layer 24. The zirconia layer 26 operates to reduce the mismatch in atomic spacing between the aluminide coating 14 and the YSZ layer 24. The zirconia layer 26 may be formed before YSZ layer 24 is applied, during application of YSZ layer 24, or after YSZ layer 24 is formed by heating the gas turbine engine component 10 in an oxidizing atmosphere at a suitable temperature. In one specific embodiment, zirconia layer 26 may be formed by depositing metallic zirconium on aluminide coating 14 and then heating gas turbine engine component 10 in air at a temperature of about 1100° F. to about 1200° F. Alternatively, a metallic zirconium layer may be anodized to form the zirconia layer 26. The zirconium layer for forming zirconia layer 26 may be provided from an external receptacle 71 to a deposition environment 44 suitable for growing the aluminide coating 14, as described below in the context of FIG. 6, or may be deposited in a different and distinct deposition environment from the aluminide coating 14.

Figure 3A:
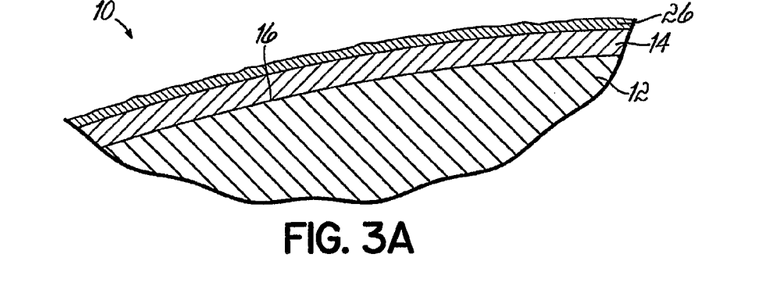
FIG. 3A is a diagrammatic cross-sectional view of a portion of a coated gas turbine engine component in accordance with yet another alternative embodiment of the present invention.

As shown in FIG. 3A and in accordance with an alternative embodiment of the present invention, the layer of metallic zirconium used to form the zirconia layer 26 may be deposited under conditions of rapid deposition so that the morphology of the parent zirconium layer is rough, rather than smooth. The rough zirconium layer is then transformed into zirconia. This roughening increases the effective surface area available for bonding with the YSZ layer 24, which operates to enhance the adhesion of the YSZ layer 24 to the aluminide coating 14.

The aluminide coating 14 formed on the gas turbine engine component 10 may be formed by various techniques. Representative techniques will be described below. Generally, a silicon-containing layer 30 (FIG. 4) is applied to the original surface 16 of the gas turbine engine component 10, such as a turbine blade, before the aluminide coating 14 is formed in a CVD apparatus 40 (FIG. 5). The yttrium and/or hafnium dopant in the aluminide coating 14 may be supplied as a vapor phase reactant from a source external to the CVD apparatus 40 and incorporated during the formation of the aluminide coating 14. Alternatively, the yttrium and/or hafnium dopant in the aluminide coating 14 may be added to the silicon-containing layer applied to the original surface 16 before forming the aluminide coating 14 in the CVD apparatus 40.

Figure 4:
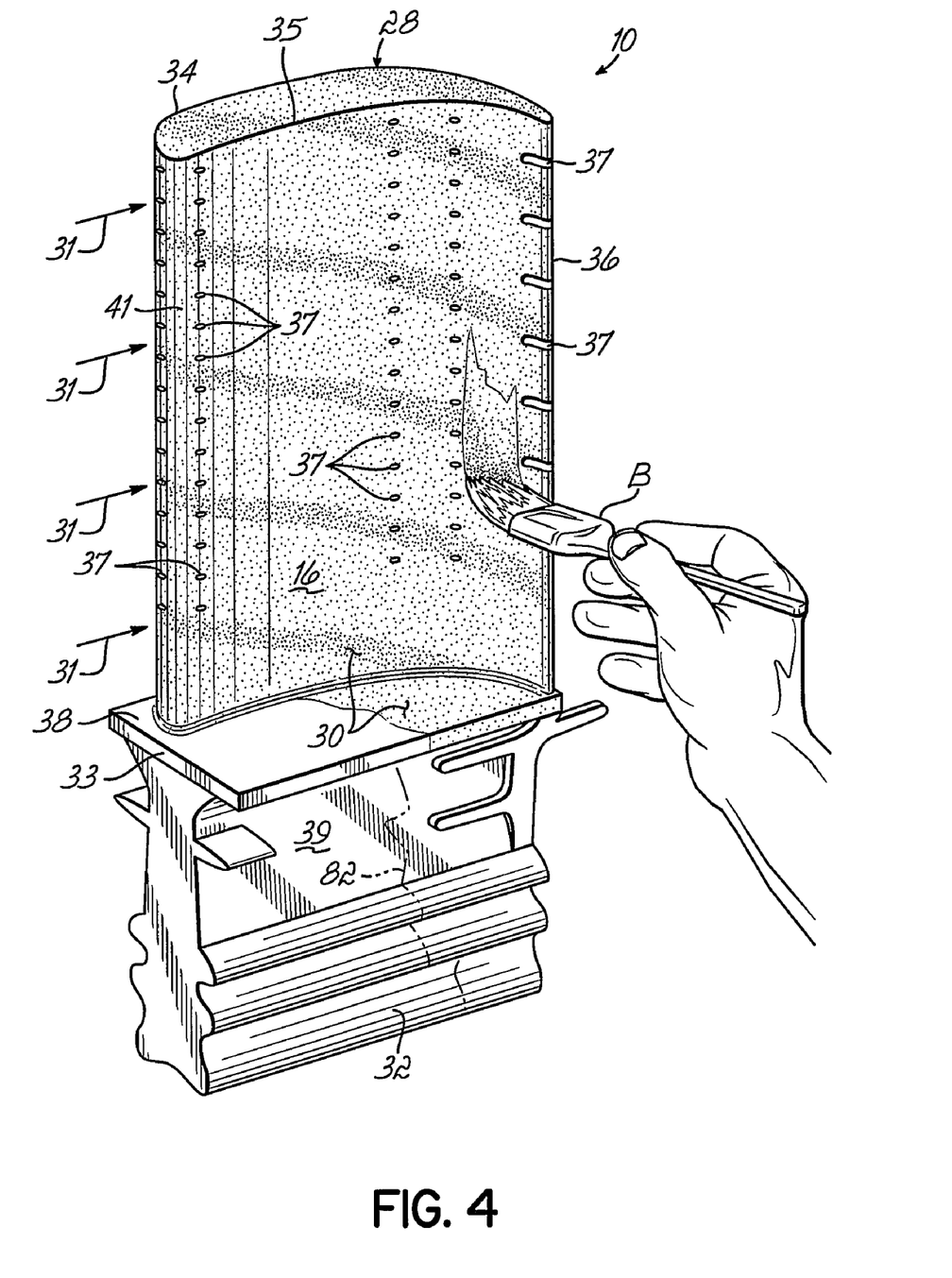
FIG. 4 is a perspective view of a gas turbine engine component with a liquid being applied thereto in accordance with the principles of the present invention.
Figure 5:
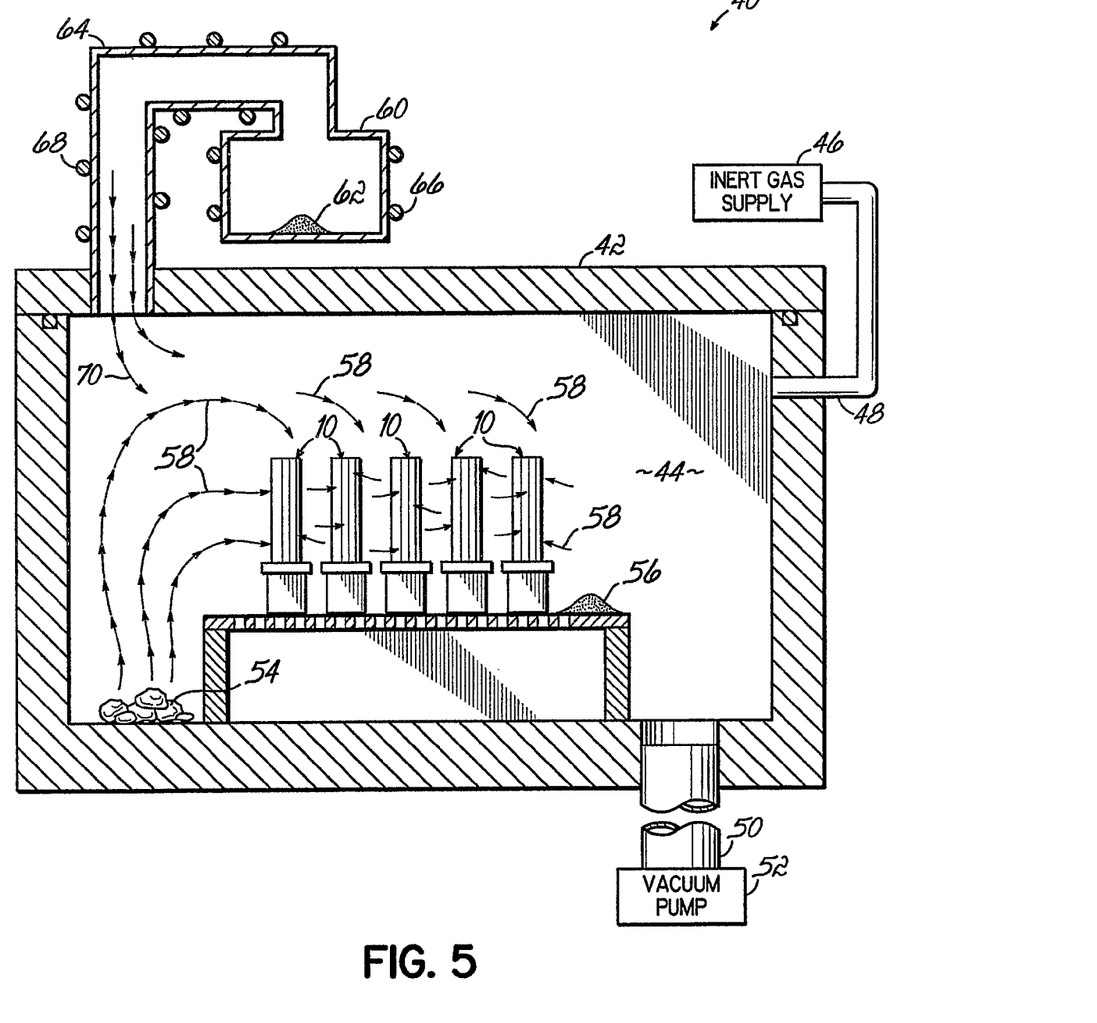
FIG. 5 is a schematic view showing gas turbine engine components, such as that from FIG. 1 or FIG. 1A, in a deposition environment of a simple CVD deposition system for purposes of explaining the principles of the present invention.

With reference to FIG. 4 and in accordance with principles of the present invention, the silicon-containing layer 30 is applied to the original surface 16 of the gas turbine engine component 10 before the aluminide coating 14 is formed in the CVD apparatus 40 (FIG. 5). The silicon-containing layer 30 may be applied as a liquid or solution and then dried to form a pre-coating resident on the gas turbine engine component 10 before aluminiding occurs.

The gas turbine engine component 10 of the representative construction includes an airfoil segment 28 designed to be in the high-pressure, hot airflow path (as indicated by arrows 31). Integral with airfoil segment 28 is a root 32 used to secure gas turbine engine component 10 to the turbine disk (not shown) of the gas turbine engine (not shown). The original surface 16 of the airfoil segment 28 of gas turbine engine component 10 is divided into upper and lower airflow surfaces 34, 35 extending between a tip edge 36 and a curved foil tip 41. Cooling channels or passages internal to airfoil segment 28 include surface cooling holes 37 on original surface 16 so as to permit cooling air to pass through the interior of airfoil segment 28 while gas turbine engine component 10 is in service on the gas turbine engine. The root 32 includes an upper surface 38 on a platform 33 and a contoured surface 39 extending beneath the platform 33.

Depending upon the use of the gas turbine engine component 10, combustion gases in the airflow path 31 may have a temperature as high as 3000° F. This promotes heating of the airfoil segment 28. Gas cooling of the airfoil segment 28 limits operating temperatures to 1800° F. or less. When the gas turbine engine component 10 is in service, portions of the component 10 below the platform 33 are cooler than the airfoil segment 28 and, frequently, are at an operating temperature of less than 1500° F. when the component 10 is in service. The cooler portions include the root 32, which is coupled with an air-cooled turbine disk of the gas turbine.

In accordance with an aspect of the present invention, it may be desirable to protect at least the original surface 16 of airfoil segment 28 and, optionally, the upper surface 38 of root 32 all of which may be exposed to high-pressure, high heat airflow as at 31. Accordingly, the silicon-containing layer 30 may be applied to surface 16 and, optionally, surface 38, such as by hand application with a paint brush B (FIG. 4), with silicon-containing layer 30 being applied in a liquid form and, thereafter, dried to form a solid or semi-solid coating. Alternatively, gas turbine engine component 10 may be inverted and dipped into a bath (not shown) to form silicon-containing layer 30 or may be sprayed with a suitable liquid or solution before drying and heating. Thereafter, the pre-coated gas turbine engine component 10 (which may advantageously first be dried and heated) may be placed into the deposition environment 44 (FIG. 5) whereupon aluminide coating 14 will be formed on surfaces 16 and 38 to the desired thickness. The remaining portions of root 32, which are to interfit with other components of the turbine disk (not shown), are advantageously either shielded so that no intermetallic layer forms thereon or are permitted to form a thinner aluminide layer (not shown) that may be removed by conventional means before gas turbine engine component 10 is placed into the turbine disk (not shown) for deployment in the gas turbine engine (not shown).

Additionally, and advantageously, the interior channels of gas turbine engine component 10 may be protected. It is possible to apply the silicon-containing layer 30 to the internal surfaces of these channels, such as by dipping airfoil segment 28 into a bath (not shown) of a suitable liquid or solution. The liquid or solution will then migrate through cooling holes 37 into the interior channels and coat the surfaces of these channels with layer 30. Thereafter, silicon-containing layer 30 may be dried such as in an oven to the desired temperature. Thereafter, placement of the pre-coated gas turbine engine component 10 in the deposition environment 44 (FIG. 5) will cause aluminide coating 14 (FIGS. 1, 1A) to grow on not only surface 16, and optionally surface 38, but may also assist in causing a thickness of aluminide coating 14 to form on the surfaces of channels to thereby provide protection in those portions of gas turbine engine component 10 as well.

A liquid suitable for forming layer 30 may be a silane. Silanes suitable for use in the present invention may have mono-, bis-, or tri-functional tlialkoxy silane. The silane may be a bifunctional trialkoxy silyl, preferably trimethoxy, or triethoxy silyl groups. Amino silanes may also be used, although thio silanes may not be desired due to their sulfur content. Bisfunctional silane compounds are well known, and two preferred for use in the present invention are bis(triethoxysilyl)ethane and bis(trimethoxysilyl) methane. In both of these compounds, the bridging group between the two silane moieties is an alkyl group. Additional commercially available silanes include, but are not limited to, 1,2-Bis(tetramethyldisoloxanyl)Ethane
1,9-Bis(triethoxysilyl)Nonane
Bis(triethoxysilyl)Octane
Bis(trimethoxysilyl Ethane
1,3-Bis(trimethylsiloxy)-1,3-Dimethyl Disiloxane
Bis(trimethylsiloxy)Ethylsilane
Bis(trimethylsiloxy)Methylsilane
Al-501 available from AG Chemetall (Frankfurt Germany)

The silane may neat, in an aqueous solution, or in an aqueous/alcohol solvent solution. A solvent for the latter type of solution may contain from about 1-2% by volume to about 30% by volume deionized water with the remainder being a lower alcohol, such as methanol, ethanol, propanol, or the like. Ethanol and methanol are preferred. The solvent is combined with the silane and glacial acetic acid to establish a pH of about 4-6. The concentration of the silane compound is not relevant as long as the silane remains in solution during application. Generally, the solution will have about 1% to about 20% silane (which may be measured either by volume or by weight in this range).

A particularly useful silane for use in providing layer 30 may be an organofunctional silane such as BTSE 1,2 bis (triethoxysilyl)ethane or BTSM 1,2 bis(trimethoxysilyl) methane. The silane may be dissolved in a mixture of water and acetic acid at a pH of four (4), then in denatured alcohol and glacial acetic acid to establish a silane solution. The silane concentration in the solution is between about 1% and 10% by volume and, advantageously, about 5% by volume. This silane solution readily forms the more or less hard silicon-containing layer 30 at temperatures readily achieved.

The liquid or solution is applied liberally by, for example, spraying or dipping and any excess is poured off as it is applied, or it is applied by brush B (FIG. 5) as if being painted, to define the silicon-containing layer 30. The gas turbine engine component 10 with the silicon-containing layer 30 in the form of a silane solution is allowed to dry and then is heated, such as with a heat gun (not shown) or even in a conventional oven (not shown), to about 250° F. (121° C.) for about 15 to 25 minutes, to form the silicon-containing layer 30. Before heating, the silicon-containing layer 30 may first be allowed to dry thereon, such as underneath a lamp (not shown), to remove solvent. Generally, the silicon-containing layer 30 is applied in an amount of about 0.01 g/cm$^2$ to about 2.0 g/cm$^2$. Multiple layers 30 of liquid or solution may be applied; each individual layer being dried and heated before applying the next successive coating. As used herein, the silicon-containing layer 30 may refer to either the initially applied layer of liquid or solution, or without limitation to the dried layer.

With reference to FIG. 5, a CVD apparatus 40 suitable for use in forming the aluminide layers 14 (FIGS. 1 and 1A) includes a main reaction chamber 42 enclosing an interior space 44 defining a deposition environment when purged of atmospheric gases, and evacuated. Inert gas, such as argon, is supplied from a gas supply 46 to the reaction chamber 42 through an inlet port 48 defined in the wall of chamber 42. An exhaust port 50 defined in the wall of the reaction chamber 42 is coupled with a vacuum pump 52 capable of evacuating the reaction chamber 42 to a vacuum pressure. One or more gas turbine engine components 10 are introduced into the reaction chamber 42 and are situated away from a source of extrinsic metal, as explained below.

Positioned within the reaction chamber 42 is a mass or charge of a solid donor material 54, a mass or charge of an activator material 56 and several gas turbine engine components 10. The gas turbine engine components 10 are fabricated from a superalloy material. Suitable solid donor materials 54 include alloys of chromium and aluminum, which are preferably low in sulfur content (<3 ppm sulfur). One suitable donor material 54 is 44 wt % aluminum and balance chromium. Appropriate activator materials 56 suitable for use in the invention include, but are not limited to, aluminum fluoride, aluminum chloride, ammonium fluoride, ammonium bifluoride, and ammonium chloride. The reaction chamber 42 is heated to a temperature effective to cause vaporization of the activator material 56, which promotes the release of a vapor phase reactant from the solid donor material 54. This vapor contains an extrinsic metal, typically aluminum, that contributes a first extrinsic metal for incorporation into aluminide coating 14 (FIG. 1) formed on component 10, as diagrammatically indicated by arrows 58. The extrinsic metal is separate, distinct, and independent from the material comprising the gas turbine engine component 10 and any coating preapplied to component 10.

With continued reference to FIG. 5, positioned outside the reaction chamber 42 is a receptacle 60 in which a second solid donor material 62 is provided. The solid of a second extrinsic metal separate and distinct from the gas turbine engine component 10. The second extrinsic metal combines with the first extrinsic metal supplied from donor material 54 to form the aluminide coating 14 on the gas turbine engine component 10. The receptacle 60 and a conduit 64 leading from the receptacle 60 to the reaction chamber 42 are heated with respective heaters 66, 68.

The second solid donor material 62 provided in receptacle 60 may be any solid yttrium-halogen Lewis acid, such as $YCl_3$. The yttrium-halogen Lewis acid may be ACS grade or reagent grade chemical that is high in purity and substantially free of contaminants, such as sulfur. Upon heating, such yttrium-halogen Lewis acid converts from a dry solid form to a liquid form and, when the temperature of the receptacle 60 is further increased, convert from the liquid form to a vapor to provide the vapor phase reactant containing yttrium. The vapor phase reactant from solid donor material 62 is conveyed or transported through the conduit 64 to the main reaction chamber 42, as diagrammatically indicated by arrows 70. The rate at which the vapor phase reactant from solid donor material 62 is provided to the main reaction chamber 42 is regulated by controlling the temperature of the receptacle 60 with the power to heaters 66, 68. Of course, the delivery of vapor phase reactant from solid donor material 62 may be discontinued by sufficiently reducing the temperature of the receptacle 60 or with a valve (not shown) controlling flow in conduit 64.

In use and with continued reference to FIG. 5, the silicon-containing layer 30 is applied to the original surface 16 of substrate 12, preferably before gas turbine engine component 10 is placed inside the main reaction chamber 42. The silicon-containing layer 30 is applied as a liquid and then dried to form a coating. The gas turbine engine component 10 bearing the silicon-containing layer 30 is then introduced into the main reaction chamber 42, a charge of the first donor material 54, and a charge of the activator material 56 are introduced into the reaction chamber 42, and a charge of the solid yttrium-halogen Lewis acid is introduced as the second donor material 62 into the receptacle 60. The receptacle 60 and the reaction chamber 42 are purged of atmospheric gases by repeatedly admitting an inert gas from inert gas supply 46 through inlet port 48 and evacuating through exhaust port 50 with vacuum pump 52.

The main reaction chamber 42 is heated to a temperature effective to release activator material 56, which interacts with first donor material 54 to release the first vapor phase reactant including metal from material 54. Aluminum present in the vapor phase reactant begins to form the silicon-containing aluminide coating 14 (FIG. 1) on the gas turbine engine component 10. After the aluminide coating 14 begins to form, receptacle 60 is heated by heater 66 to a temperature effective to form a second vapor phase reactant from solid donor material 62, which is provided as an yttrium-containing vapor to the reaction chamber 42 through heated conduit 64. The yttrium is incorporated into the thickening aluminide coating 14. Persons of ordinary skill in the art will recognize that additional steps, such as soaks and cleaning cycles, may be involved in the coating process. The gas turbine engine components 10 are removed from the reaction chamber 42 and, optionally, the YSZ layer 24 may be applied by a different process.

Figure 6:
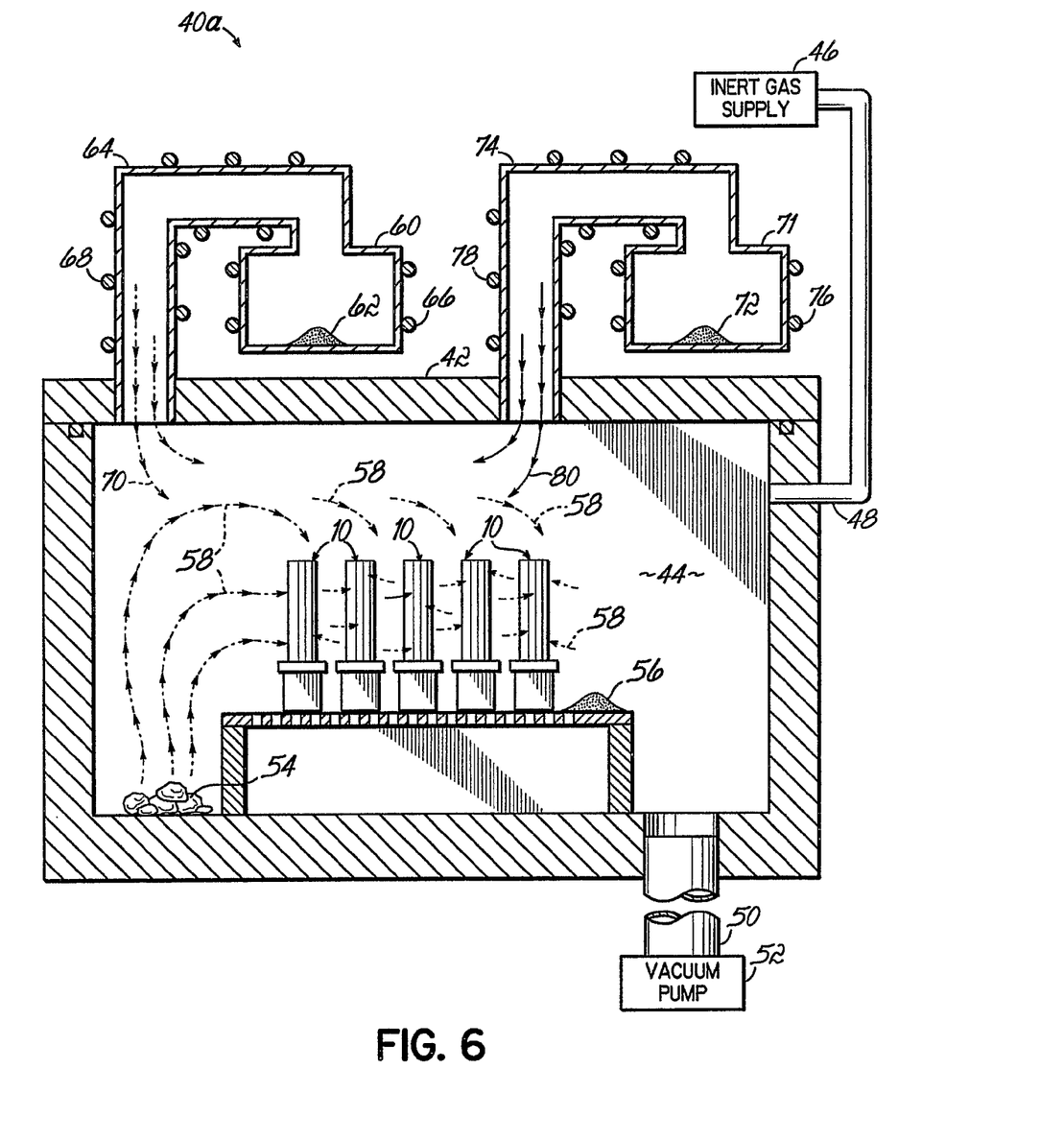
FIG. 6 is a schematic view showing gas turbine engine components, such as that from FIGS. 3 and 3A, in a deposition environment of a simple CVD deposition system similar to FIG. 5.

With reference to FIG. 6 in which like reference numerals refer to like features in FIG. 5, another receptacle 71 may be positioned outside the reaction chamber 42. Another solid donor material 72 provided in receptacle 71 furnishes a source of an extrinsic metal separate and distinct from the gas turbine engine component 10 and separate and distinct from the yttrium-halogen Lewis acid comprising the second donor material 62 in receptacle 60. Depending upon the deposition process, this extrinsic metal from the donor material 72 may combine with the first extrinsic metal supplied from donor material 54, may combine with yttrium material supplied to the gas turbine engine component 10 from the second donor material, or may deposit separately on the gas turbine engine component 10. The receptacle 71 and a conduit 74 leading from the receptacle 71 to the reaction chamber 42 are heated with respective heaters 76, 78 in order to release the vapor phase reactant from the donor material 72 and supply the vapor phase reactant to the main reaction chamber 42.

The solid donor material 72 provided in receptacle 71 may be any solid Lewis acid, such as $AlCl_3$, $CoCl_4$, $CrCl_3$, $CrF_3$, $FeCl_3$, $HfCl_3$, $IrCl_3$, $PtCl_4$, $RhCl_3$, $RuCl_3$, $TiCl_4$, $ZrCl_4$, and $ZrF_4$. The Lewis acid may be ACS grade or reagent grade chemical that is high in purity and substantially free of contaminants, such as sulfur. Upon heating, such Lewis acids convert from a dry solid form to a liquid form and, when the temperature of the receptacle 71 is further increased, convert from the liquid form to a vapor to provide the vapor phase reactant containing the associated extrinsic metal. The vapor phase reactant from solid donor material 72 is conveyed or transported through the conduit 74 to the main reaction chamber 42, as diagrammatically indicated by arrows 80. The rate at which the vapor phase reactant from solid donor material 72 is provided to the main reaction chamber 42 is regulated by controlling the temperature of the receptacle 71 with variations in the power supplied to heaters 76, 78. Of course, the delivery of the vapor phase reactant from solid donor material 72 may be discontinued by sufficiently reducing the temperature of the receptacle 71 to halt vaporization or with a valve (not shown) controlling flow through conduit 74.

The vapor phase reactants from receptacles 60 and 71 may be provided separately to the main reaction chamber 42, so that the extrinsic metals from solid donor materials 62, 72 are not co-deposited on gas turbine engine component 10, although the invention is not so limited. The separate control is achievable by, for example, lowering the temperature of each receptacle 60, 71, as required, so that the corresponding vapor phase reactant is not produced and, hence, not supplied to the main reaction chamber 42. In addition, the temperature of the main reaction chamber 42 may be controlled so that the vapor phase reactant from donor material 54 is controllably present or absent while one or both of the receptacles 60, 71 supplies the corresponding vapor phase reactant to the main reaction chamber 42.

The donor material 54 may be any solid hafnium-halogen Lewis acid, such as $HfCl_3$, for providing a vapor phase reactant including hafnium to the main reaction chamber 42. The vapor phase reactant from donor material 54 in receptacle 71 may be provided simultaneously with the vapor phase reactant from donor material 62 in receptacle 60 so that the aluminide coating 14 is co-doped with yttrium and hafnium, along with silicon. Alternatively, receptacle 60 may be controlled so that the only vapor phase reactant supplied to main reaction chamber 42 originates from donor material 54 in receptacle 71. In this alternative embodiment, the aluminide coating 14 contains only the dopant hafnium, in addition to silicon.

By controlling the introduction of the vapor phase reactants, a vapor phase reactant of, for example, zirconium may be independently supplied from receptacle 71 to the main reaction chamber 42 and to, for example, deposit over the aluminide coating 14 (FIG. 3) previously formed on component 10 by a deposition process inside the main reaction chamber 42. Such a process may be used, as described above, for forming the zirconium layer that ultimately creates the zirconia layer 26 (FIG. 3).

In an alternative embodiment of the present invention, the silicon-containing layer 30 may further include an additive that supplies the yttrium and/or hafnium that eventually is incorporated into aluminide coating 14 as a dopant. Suitable additives generally include any compound of yttrium and/or hafnium that is dissolvable in the particular silane solution, although additives containing sulfur ligands and/or oxygen ligands may be disfavored. Suitable yttrium compounds include, but are not limited to, yttrium halides, such as yttrium chloride, yttrium bromide, yttrium iodide, and yttrium fluoride, yttrium acetate hydrate, yttrium 2-ethylhexanoate, yttrium perchlorate solution (e.g., 40 wt. % in water), yttrium nitrate hexahydrate, yttrium nitrate tetrahydrate, yttrium isopropoxide oxide, yttrium isopropoxide solution (e.g., 25 wt. % in toluene), yttrium butoxide solution (e.g., 0.5 M in toluene), yttrium trifluoroacetate hydrate, yttrium oxalate hydrate, and yttrium(III) tris(2,2,6,6-tetramethyl-3,5-heptanedionate). Suitable hafnium compounds include, but are not limited to, hafnium halides, such as hafnium chloride, hafnium bromide, hafnium iodide, and hafnium fluoride, any hafnium compound with an organic ligand, such as hafnium tert-butoxide, hafnium acetate, and hafnium nitrates. Permitted hafnium compounds generally exclude compounds with either sulfur ligands or oxide ligands. These yttrium and hafnium compounds are commercially available, for example, from Sigma-Aldrich (St. Louis, Mo.).

In this alternative embodiment of the present invention, one or more of the yttrium and/or hafnium compounds is dissolved in or combined with the silane or silane solution. Before combining, the amount of the added yttrium and/or hafnium compounds is measured for accurately regulating the concentration of yttrium and/or hafnium resident in the silicon containing layer 30. Typically, a single yttrium compound or a single hafnium compound will be combined with the silane to form a solution and applied to all or a portion of the gas turbine engine component 10.

Figure 7:
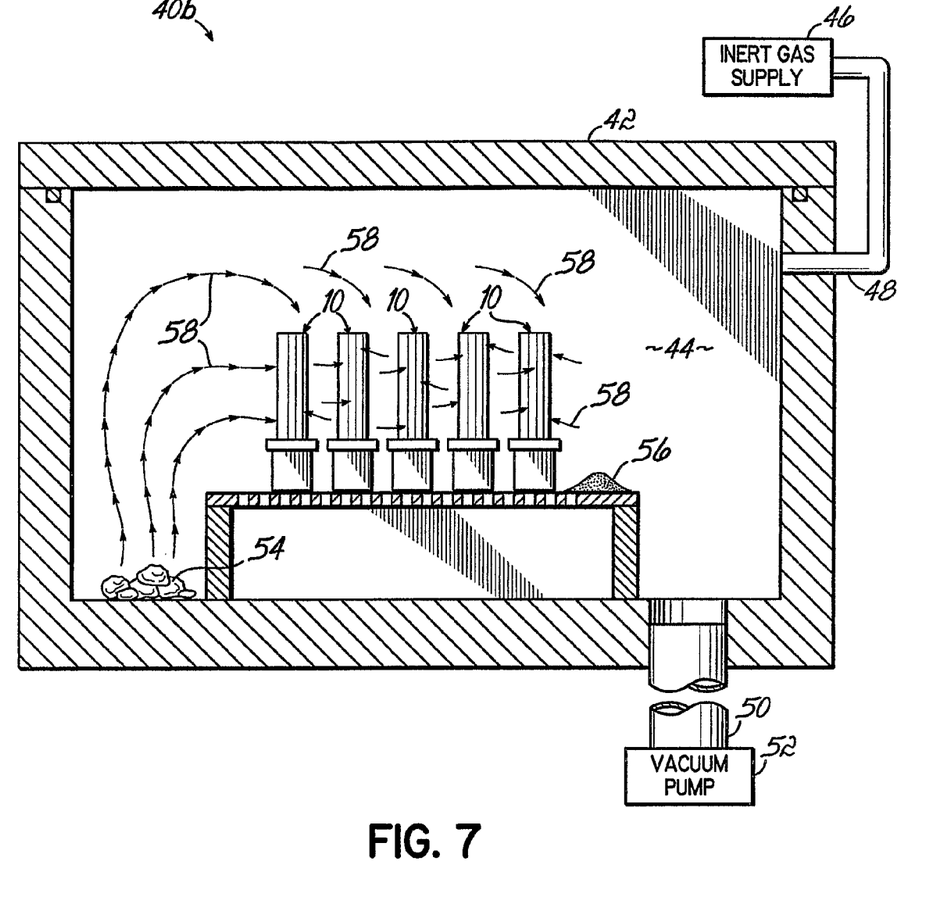
FIG. 7 is a schematic view showing gas turbine engine components, such as that from FIGS. 3 and 3A, in a deposition environment of a simple CVD deposition system similar to FIG. 5.

With reference to FIG. 7 in which like reference numerals refer to like features in FIGS. 5 and 6, the CVD apparatus 40 will not require an external receptacle, like receptacles 60 and 71 (FIGS. 5 and 6) because the silicon-containing layer 30 includes an additive that ultimately supplies the yttrium and/or hafnium as a dopant to the aluminide layer 14. Hence, an externally generated vapor phase reactant is not required to provide the dopant to the deposition environment 44 and such receptacles 60, 71 may be omitted. Even if receptacles 60, 71 are present, they may be inactive (i.e., not supplying a vapor phase reactant) as the aluminide layer 14 is formed. However, it is appreciated that one dopant, such as yttrium, may be applied in silicon-containing layer 30 and that a second dopant, such as hafnium, may be supplied to the deposition environment 44 in a vapor phase reactant so that the aluminide layer 14 is co-doped with hafnium and yttrium. When the reaction chamber 42 is heated to a temperature effective to cause vaporization of the activator material 56, a vapor phase reactant is released from the solid donor material 54 and contains an extrinsic metal, typically aluminum, that contributes an extrinsic metal for incorporation into aluminide layer 14 (FIG. 1) formed on component 10. The extrinsic metal is separate, distinct, and independent from the material comprising the gas turbine engine component 10 and any coating 30 preapplied to component 10. The metal in the vapor phase reactant, the silicon from coating 30, and the yttrium and/or hafnium from coating 30 combine to form the aluminide layer 14.

The aluminide layer 14 may also be formed on gas turbine engine components 10 including the silicon-containing layer 30 by various methods known in the art, including but not limited to dynamic CVD and pack coating deposition processes such as an above-the-pack process or an in-the-pack process.

Figure 8:
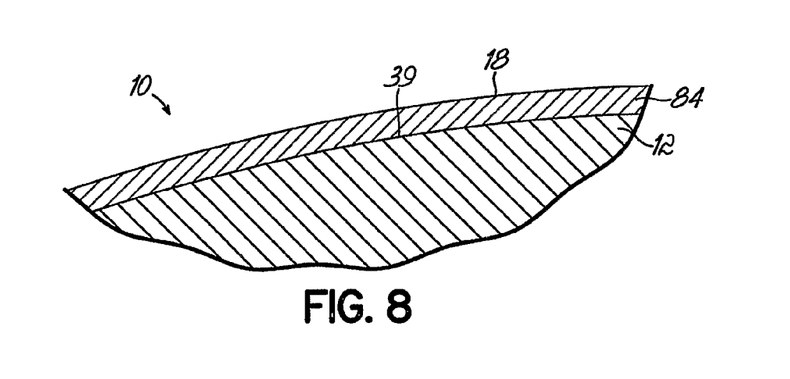
FIG. 8 is a diagrammatic cross-sectional view of a region of a coated gas turbine engine component in accordance with another alternative embodiment of the present invention.

With reference to FIGS. 4 and 8 and in accordance with yet another alternative embodiment of the present invention, all or a portion of surface 39 of at least one of the gas turbine engine components 10 may be coated exclusively with a layer 82 containing silicon and a dopant selected from the group consisting of yttrium, hafnium, and combinations thereof. Layer 82 is formed from any of the liquids or solutions containing silicon, and yttrium and/or hafnium suitable for forming layer 30, as described above, and may be applied by the same techniques across all or a portion of surface 39. However, surface 16 is not coated with silicon-containing layer 30. The gas turbine engine component 10, which has portions below platform 33, such as root 32, partially or completely coated with layer 82, is heated to a temperature and for a duration effective to transform layer 82 into a protective coating 84 across regions of surface 39 coated initially with layer 82. A typical heating temperature ranges from about 300° F. to about 600° F., although the invention is not so limited. This transformation may be accomplished by placing the gas turbine engine component 10 into a heated enclosure, like an oven or furnace. The protective layer 84 is a glass precursor of silica containing yttrium and/or hafnium.

The protective coating 84 operates to protect portions of the gas turbine engine component 10 below platform 33, such as the root 32, against sulfidation and, hence, against the acceleration of oxidation by sulfidation. The placement of this layer 84 on all or a portion of surface 39 differs from past treatments for gas turbine engine components in which it was considered to not be beneficial to apply a coating to surface 39 because of the need to maintain tight dimensional tolerances. However, layer 84 is a thin layer that either does not affect dimensional tolerances or is taken into account when manufacturing the component 10.

In an alternative embodiment of the present invention, all or a portion of surface 39 of at least one of the gas turbine engine components 10 may be coated with layer 82, the airfoil segment 28 may be coated with layer 30, and, optionally, surface 38 may also be coated with a portion of layer 30. Thereafter, each gas turbine engine component 10 is introduced into the deposition environment 44 of main reaction chamber 42 (FIG. 7). In this instance, portions of the component 10 below the platform 33, including the root 32, are shielded or covered during the process that forms aluminide coating 14 on the airfoil segment 28 so that aluminide does not form on surface 39. However, the heating causes protective coating 84 to form on surface 39. In addition, aluminide coating 14 is formed on original surface 16 and, optionally, on surface 38.

The present invention is generally applicable to turbine engine components 10 used in the gas turbines of either jet engines or in industrial gas turbine engines. In particular, the present invention is applicable for protecting turbine blades in such engines and, more particularly, for protecting turbine blades in the gas turbines used in jet engines.

While the present invention has been illustrated by the description of an embodiment thereof and specific examples, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicant's general inventive concept.

Having described the invention, what is claimed is:

1. A deposition process comprising:
    obtaining a jet engine component of a nickel-based superalloy, the jet engine component having an external surface;
    applying a liquid composition containing silicon and an additive that is dissolvable in the liquid composition and that supplies a dopant to at least a portion of the external surface; and
    exposing the jet engine component to a donor material including a metal to form an aluminide coating including the metal from the donor material, silicon from the liquid composition, and the dopant from the liquid composition, the dopant being effective to reduce the transport of sulfur through the aluminide coating.

2. The deposition process of claim 1 further comprising:
    forming a zirconia layer on the aluminide coating.

3. The deposition process of claim 2 further comprising:
    forming a ceramic thermal barrier layer on the zirconia layer.

4. The deposition process of claim 2 wherein forming the zirconia layer further comprises:
    depositing a zirconium layer on the aluminide coating; and
    converting the zirconium layer to zirconia.

5. The deposition process of claim 4 wherein the zirconium layer is deposited in the same deposition environment in which the jet engine component is exposed to the donor material.

6. The deposition process of claim 4 wherein the zirconium layer is deposited at a deposition rate effective to provide surface texturing.

7. The deposition process of claim 6 further comprising:
    forming a ceramic thermal barrier layer on the textured surface of the zirconia layer, the textured surface enhancing the adhesion of the ceramic thermal barrier layer to the jet engine component.

8. The deposition process of claim 1 wherein the dopant is selected from the group consisting of yttrium, hafnium, and combinations thereof.

9. The deposition process of claim 1 wherein the dopant is yttrium.

10. The deposition process of claim 1 wherein the dopant is hafnium.

11. The deposition process of claim 1 wherein the liquid composition containing silicon is a silane.

\* \* \* \* \*

UNITED STATES PATENT AND TRADEMARK OFFICE
CERTIFICATE OF CORRECTION

| | | |
|---|---|---|
| PATENT NO. | : 7,901,739 B2 | Page 1 of 1 |
| APPLICATION NO. | : 11/575105 | |
| DATED | : March 8, 2011 | |
| INVENTOR(S) | : David C. Fairbourn | |

It is certified that error appears in the above-identified patent and that said Letters Patent is hereby corrected as shown below:

On the title page, abstract section in the second column:
In the second line, change "include" to --including--
In the thirteenth line, change "maybe" to --may be--.

In column 2:
Line 19, change "is" to --as--
Line 61, after "component", insert --is--.

In column 7, line 62, change "tlialkoxy" to --trialkoxy--.

In column 8, line 8, after "trimethoxysilyl", insert --)--.

In column 9:
Line 26, after "solid", insert --donor material 62 furnishes a source--
Line 42, change "convert" to --converts--.

Signed and Sealed this
Twenty-ninth Day of May, 2012

David J. Kappos
*Director of the United States Patent and Trademark Office*